United States Patent
Patel et al.

(10) Patent No.: US 8,997,157 B1
(45) Date of Patent: Mar. 31, 2015

(54) AUDIO/VIDEO SATELLITE BROADCAST NETWORK

(75) Inventors: Harish N. Patel, Huntington Beach, CA (US); Daniel A. Lotocky, Fullerton, CA (US); Nathan B. Zerbe, El Segundo, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1612 days.

(21) Appl. No.: 10/464,228

(22) Filed: Jun. 18, 2003

(51) Int. Cl.
| | |
|---|---|
| *H04N 7/20* | (2006.01) |
| *H04N 21/436* | (2011.01) |
| *H04N 21/433* | (2011.01) |
| *H04N 21/432* | (2011.01) |
| *H04N 21/426* | (2011.01) |
| *H04N 5/44* | (2011.01) |

(52) U.S. Cl.
CPC .......... *H04N 21/436* (2013.01); *H04N 21/433* (2013.01); *H04N 21/4325* (2013.01); *H04N 21/426* (2013.01); *H04N 21/43615* (2013.01); *H04N 21/4334* (2013.01); *H04N 5/4401* (2013.01); *H04N 21/43607* (2013.01); *H04N 21/42607* (2013.01); *H04N 21/432* (2013.01)
USPC ................... 725/71; 725/68; 725/74; 725/78; 725/81; 725/85; 725/109; 725/110; 725/112; 725/131; 725/139; 725/151

(58) Field of Classification Search
CPC .............. H04N 5/4401; H04N 21/426; H04N 21/42607; H04N 21/432; H04N 21/4325; H04N 21/433; H04N 21/4334; H04N 21/436; H04N 21/43607; H04N 21/43615
USPC ............ 725/68, 71, 74, 78, 81, 85, 109, 110, 725/112, 131, 139, 151
See application file for complete search history.

(56) References Cited

U.S. PATENT DOCUMENTS

| | | | |
|---|---|---|---|
| 5,675,390 A * | 10/1997 | Schindler et al. ............... | 725/68 |
| 5,748,732 A | 5/1998 | Le Berre et al. | |
| 5,760,822 A | 6/1998 | Coutinho | |
| 5,787,335 A | 7/1998 | Novak | |
| 5,793,413 A | 8/1998 | Hylton et al. | |
| 5,835,128 A | 11/1998 | Macdonald et al. | |
| 6,005,861 A | 12/1999 | Humpleman | |
| 6,023,603 A | 2/2000 | Matsubara | |
| 6,202,211 B1 | 3/2001 | Williams, Jr. | |

(Continued)

FOREIGN PATENT DOCUMENTS

| | | |
|---|---|---|
| WO | WO 97/19554 | 5/1997 |
| WO | WO 01/56297 | 8/2001 |

OTHER PUBLICATIONS

EPO Communication dated Jun. 16, 2009 in European Patent Application No. 04253666.4 filed Jun. 18, 2004 by Harish N. Patel et al.

*Primary Examiner* — Jeremy Duffield

(57) ABSTRACT

An audio/video network system for distributing satellite broadcast services includes an antenna unit for receiving audio/video broadcast services. The antenna unit is in communication with a master receiver, which receives the audio/video broadcast services and displays them on a first television associated with the master receiver. The master receiver is in communication with a plurality of slave clients, which receive audio/video broadcast services from the master receiver and display them on a respective television associated with each of the slave clients.

20 Claims, 2 Drawing Sheets

(56) References Cited

U.S. PATENT DOCUMENTS

| | | | |
|---|---|---|---|
| 6,588,017 B1 * | 7/2003 | Calderone | 725/120 |
| 6,622,307 B1 * | 9/2003 | Ho | 725/120 |
| 6,889,385 B1 * | 5/2005 | Rakib et al. | 725/119 |
| 6,941,576 B2 * | 9/2005 | Amit | 725/143 |
| 7,069,574 B1 | 6/2006 | Adams et al. | |
| 7,130,576 B1 | 10/2006 | Gurantz et al. | |
| 7,200,855 B2 * | 4/2007 | Laksono | 725/82 |
| 7,428,238 B2 * | 9/2008 | El Wardani et al. | 370/401 |
| 2003/0122966 A1 * | 7/2003 | Markman et al. | 725/112 |
| 2003/0188320 A1 * | 10/2003 | Shing | 725/131 |
| 2004/0163130 A1 * | 8/2004 | Gray et al. | 725/132 |

* cited by examiner

AUDIO/VIDEO SATELLITE BROADCAST NETWORK

TECHNICAL FIELD

The present invention relates generally to the architecture of an audio/video network for distributing satellite broadcast services.

BACKGROUND OF THE INVENTION

Currently, audio/video network systems for distributing satellite broadcast services are installed in single family homes, commercial establishments, multiple family units, and a variety of other locations. These network systems typically include a satellite antenna, which is mounted in a location so it can receive transmitted signals. The antenna is connected to a receiver, which in turn is connected to an associated television. Thus, the audio/video information that is received at the satellite antenna is processed by the receiver and is then displayed on the associated television.

Presently, if a user wants to receive satellite broadcast services at multiple televisions, such as at different televisions in a bar or restaurant or in different rooms of a single family home, each television must have its own receiver. Each receiver has located therein the necessary hardware and software for programming signals received by the satellite antenna and transmitting them to an associated television for display. Each receiver also has all the necessary system resources and applications stored therein. This system configuration is relatively expensive to install and maintain.

Initially, a system with this configuration is relatively expensive to install because, if a user has multiple receivers installed to receive satellite broadcast services at multiple televisions, each receiver must be directly connected to the satellite antenna, such as by a coaxial cable. In addition to the installation costs of running cables from the satellite antenna to multiple locations in a house, the cables are typically exposed or visible and multiple cables running from a single source to multiple rooms in a single location can be relatively unattractive.

Further, because each television needs its own receiver, utilizing the system at multiple sites in a single location can be expensive. This is primarily due to the fact that each receiver must be equipped with all the necessary hardware and software components to provide a user with all the desired services. This feature must be provided regardless of whether that home or commercial establishment has other receivers and regardless of the number of receivers employed at that location. Moreover, if new services are available that a user desires, each receiver must be replaced or otherwise updated or modified in order for the user to receive these new services. Obviously, this can significantly increase the cost of operating and maintaining the system. Additionally, as a user adds more televisions where they desire service, the cost will also increase, due to the necessity of purchasing additional receivers.

It would, therefore, be desirable to provide an audio/video network for distributing satellite broadcast services to multiple televisions at a single location that is relatively easy to install and is relatively inexpensive to operate and maintain.

SUMMARY OF THE INVENTION

It is therefore an object of the present invention to provide an audio/video network system for distributing satellite broadcast services that is less expensive to install than prior network systems.

It is a further object of the present invention to provide an audio/video network system that is less expensive than current network systems to operate and maintain.

In accordance with the above and the other objects of the present invention, an audio/video network system for distributing satellite broadcast services is provided. The system includes an antenna unit for receiving audio/video broadcast services. The antenna unit is in communication with a master receiver, which receives the audio/video broadcast services and displays them on a first television associated with the receiver. The master receiver is in communication with a plurality of slave clients, which receive audio/video broadcast services from the master receiver and display them on respective televisions associated with each of slave clients.

Other objects and features of the present invention will become apparent when viewed in light of the detailed description of the preferred embodiment when taken in conjunction with the attached drawings and appended claims.

DETAILED DESCRIPTION OF THE INVENTION

Figure 1:
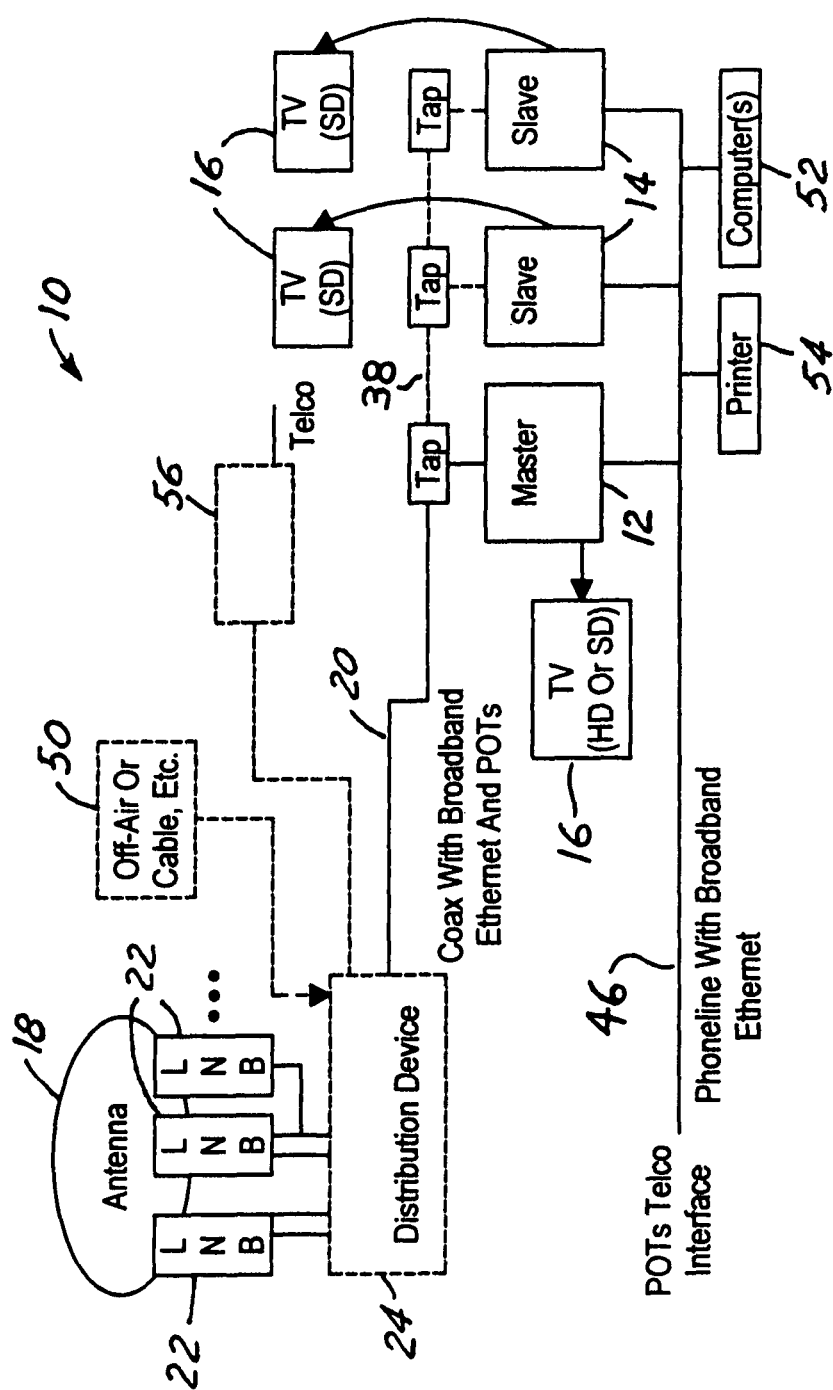
FIG. 1 is a schematic illustration of an installation of an audio/video network system in accordance with a preferred embodiment of the present invention.

Referring now to FIG. 1, which illustrates an audio/video network system 10 in accordance with the present invention. A preferred application for the disclosed system is as part of a DirecTV® Satellite System, however, it will be understood that the disclosed system may be utilized for, or as part of, a variety of other applications. The system 10 can be utilized at single family homes, commercial establishments, multiple dwelling units or at a variety of other locations. The principal components of the system 10 include a master or gateway receiver 12, one or more slave clients 14, one or more televisions 16, and an antenna unit 18. The architecture of the preferred network system 10 preferably distributes authorized services, including video/audio, games, data, digital and personal video recorder functions, Internet capability, and other services from the master receiver 12 to multiple slave clients 14 within a single location, such as a single family home. As is discussed herein, the system architecture may take on a variety of different configurations by adding or subtracting components as desired.

The antenna 18 is preferably an outdoor antenna unit that is connected by a coaxial cable 20 or other means to the master receiver 12. The antenna 18 has a plurality of low noise block down converters 22 to which received signals are communicated. The number of low noise block down converters 22 corresponds to each polarization received. The antenna unit 18 also has a distribution device 24 in communication therewith to direct down converted signals containing audio/video and other information to the master receiver 12. The master receiver 12 is in communication with an associated television 16 to display services thereon.

Figure 2:
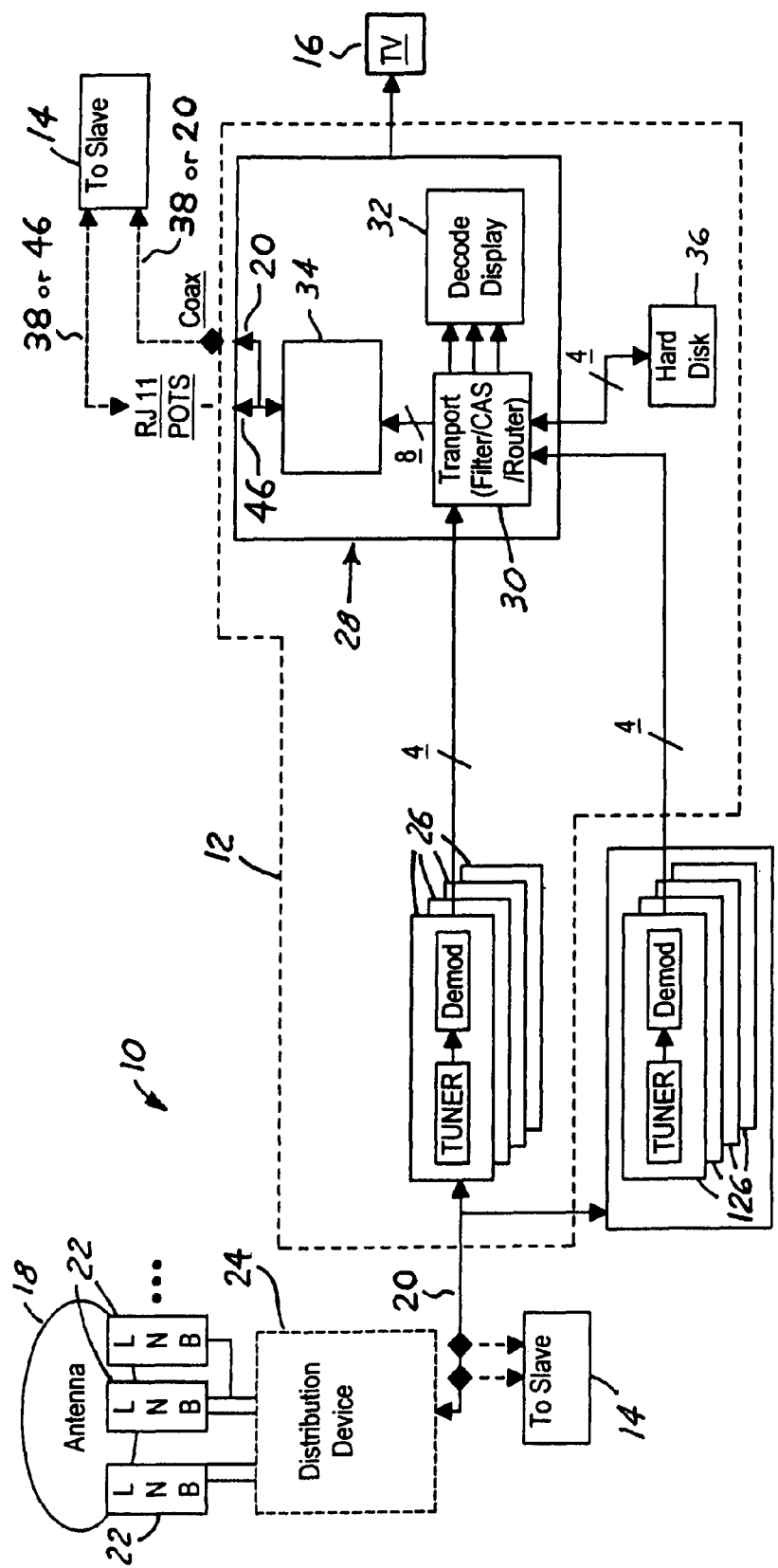
FIG. 2 is a schematic illustration of a master receiver for an audio/video network system in accordance with a preferred embodiment of the present invention

FIG. 2 illustrates a preferred embodiment of the master receiver 12 of the present invention. As discussed herein, the master receiver 12 can take on a variety of configurations depending upon the desired capabilities. As shown, the master receiver 12 has one or more tuner and demodulator cards 26 for processing the signals received from the antenna unit 18. The number of tuner and demodulator cards 26 preferably corresponds to the number of slave clients 14 on the network system 10. If a user seeks to add additional slave clients 14, all that is required is the addition of another tuner and demodulator card 126. The cards 126 are preferably configured to have snap-in connections for easy installation. The master receiver 12 also includes a decrypt/reencrypt module 28 that is in communication with each of the tuner and demodulator cards 26 and 126. Accordingly, after a signal has been processed by a tuner and demodulator card 26 or 126, it will be transmitted to the decrypt/reencrypt module 28 for further processing. The decrypt/reencrypt module 28 preferably includes a transport (filter/CAS/router) module 30, a decode display module 32, and a home networking technology that utilizes an existing home wiring module 34, which has a throughput rate of up to 100 mbps. The components of the decrypt/reencrypt module 28 will be understood by one of skill in the art.

The master receiver 12 is preferably connected to the associated television 16 and the user can control the content that is displayed on the television by a remote control unit or other similar device. The master receiver 12 also has a hard disk drive 36 incorporated therein. Obviously, any other storage medium, whether portable or permanent, may also be utilized. The master receiver 12 thus has various resources and applications, including the hard disk 36, Internet connection, games, processing, program guide, as well as a variety of other resources.

The master receiver 12 is in communication with one or more slave clients 14. In operation, the master receiver 12 tunes and demodulates the signals at a respective tuner and demodulator card 26 or 126, and routes the signals, via the transport module 30, to the slave clients 14 at MPEG transport level using the home wiring or networking module 34. Alternatively, instead of the home networking module 34 transferring information by conventional phone lines, as generally indicated by reference number 46, information may instead be transported to the slave clients 14 by wireless Internet or any other home wireless networking technology, as generally indicated by reference number 38. Utilizing home networking technology helps control and optimize the installation cost. This is because the slave clients 14 do not require a direct coaxial connection to the antenna unit 18, but rather a simple connector to the existing phone line (RJ11). Users can easily run a phone cable 46 to the nearest RJ11 jack (or have one installed) rather than routing a coaxial cable 20 from the rooftop to the master receiver 12. Moreover, the master receiver 12 and the slave clients 14 can receive information from the distribution device 24 through various network distribution techniques, such as Ethernet connection through a coaxial cable 20. However, broadband Internet Protocol (IP) network distribution is preferred. This network sharing would also eliminate the need for each slave client 14 to attach to a separate phone jack.

In accordance with the present invention, the resources and applications available on the master receiver 12 can be shared by the various slave clients 14 resulting in substantial cost savings for the other slave clients 14 on a network. In fact, it is feasible to have more slave clients 14 than the master receiver 12 is able to support simultaneously because the probability of all slave clients 14 being utilized simultaneously in a normal environment is relatively small. If the resources from the master receiver 12 are not available, the master receiver 12 will send an appropriate message to the slave clients 14 informing the user. The user will then have various options to remedy the situation, including turning off another slave client 14. Thus, the slave clients 14 within the network can be inexpensive boxes, because they do not require all the hardware as does the master receiver 12. Alternatively, the distinction between master receiver 12 and slave clients 14 could be eliminated such that they are all "peer" units. At a minimum, however, each such unit must have conditional access protection for content access or content storage. Further, one or more of such "peer" units could have storage capability or access to storage capability.

As will be appreciated and as is discussed herein, the slave clients 14 can be designed in a variety of ways. Initially, the slave clients 14 can be simple MPEG decode/display units. This embodiment provides the most cost effective slave clients 14 as they will utilize the master receiver 12 to tune, decode, and decrypt/reencrypt the audio/video and other services. This signal will be transmitted over the network to the slave clients 14 for MPEG decode and display. Thus, if future service changes require the user to replace the master receiver 12, only that box need be replaced and not the slave clients 14.

In another embodiment, the slave clients 14 can be configured without a hard drive or disk. As such, the slave clients 14 will share the resources and digital recording functions (DVR/PVR) from the hard drive 36 on the master receiver 12. In still another embodiment, all the slave clients 14 on the network system 10 can be configured like the master receiver 12. In other words, all of the boxes are master receivers 12 and the resources from any of slave clients 14 acting as master receivers can be shared with any other master receiver 12 within the network system 10.

One example of resource sharing on the system 10 is the Internet connection. In the preferred embodiment, there is only one connection to a phone line, DSL, or cable modem that is needed to provide Internet capabilities. However, the Internet connection can be simultaneously accessed by any of the master receivers 12 or the slave clients 14 within the network system 10. Another example of resource sharing on the system 10 is if a video program or a game is stored on the hard drive 36 of the master receiver 12, then it can be accessed by another master receiver 12 or one or more slave clients 14 simultaneously. By having these different designs for the slave clients 14, the installation and cost of the slave clients 14 within a single network, such as a single family home, can be optimized without sacrificing quality of services.

Moreover, home networking technology utilizing home wiring is preferably utilized, and thus the user can utilize the existing phone lines within the location and/or coaxial cable to optimize installation cost and aesthetics. If phone connection is not available, coaxial connection from the master receiver 12 to the slave clients 14 is required. Furthermore, a proper communication protocol is established between the master receiver 12 and the slave clients 14 to optimize the user's experience with the broadcast services. The protocol is a communication language between the master receivers 12 and the slave clients 14 within a network, as will be understood by one of skill in the art. An example of this communication protocol is if all the tuners and demodulation resources in a master receiver 12 are being utilized and if another slave client 14 requests the same resources, the master receiver 12 will communicate with the user of the slave client 14 to tell the user that all the resources are being utilized and will give the user other options, if available.

Referring back to FIG. 1, each slave client 14 has a television 16 associated therewith, with each slave client 14 utilizing the resources of the master receiver 12. Moreover, as shown, if the user desires to watch more satellite broadcast services, such as cable or local network television channels, an off-air connector is preferably provided, as generally indicated by reference number 50. Additionally, the system 10 preferably includes a computer 52 and associated printer 54 that are each connected to the master receiver 12 and each of the slave clients 14. The computer 52 is preferably also connected to the system by home networking technology. Moreover, the system 10 may also have a user directed receiver 56 connected to the network system 10 that provides a variety of other functions and capabilities. The computer 52 preferably performs management functions and shares content with the master receiver 12 and the slave clients 14. The printer 54 also is shared by the master 12 and the slaves 14.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

What is claimed is:

1. An audio/video network system for distributing satellite broadcast services, said system comprising:
a plurality of master receivers operable to communicate with an antenna unit for receiving the satellite broadcast services and also displaying them on a plurality of respective first televisions associated with said master receivers, each of said master receivers having a tuner-and-demodulator card for processing satellite broadcast services received from said antenna unit, and each of said master receivers having a hard drive utilized to perform digital recording functions; and
a plurality of slave clients operable to communicate with each of said master receivers for receiving said satellite broadcast services and also displaying them on a plurality of second televisions respectively associated with said slave clients, wherein said plurality of slave clients are configured without a hard drive and share resources and the digital recording features from the hard drive on each of the master receivers; and
wherein:
each of said plurality of master receivers is configured to share resources with any other master receiver and the plurality of slave clients;
there are more of the plurality of slave clients than the plurality of master receivers are able to support simultaneously;
upon an unavailability of a resource, used for the satellite broadcast services, in the plurality of master receivers, one or more of the plurality of master receivers is configured to send a message to the plurality of slave clients informing a user of the unavailability; and
in response to the message, the user is presented with one or more options for overcoming the availability, wherein the one or more options include turning off one or more of the plurality of slave clients.

2. The system of claim 1, wherein each of said master receivers is connected to said antenna unit by a coaxial cable.

3. The system of claim 1, wherein at least one of said slave clients is connected to at least one of said master receivers by a phone line, or other existing home wiring.

4. The system of claim 1, wherein each hard drive stores various system resources and applications.

5. The system of claim 1, wherein each of said master receivers has a connection to the Internet.

6. The system of claim 5, wherein each of said slave clients can access said Internet through at least one of said master receivers.

7. The system of claim 1, said system further comprising:
a distribution device operable to communicate with said antenna unit for transmitting said satellite broadcast services as received to said master receivers.

8. The system of claim 7, wherein said distribution device is operable to communicate with an off-line connection device for transmitting audio and video information.

9. A method of providing satellite broadcast services over an on-site network, said method comprising the steps of:
receiving, from an antenna, satellite broadcast signals at a plurality of master receivers, wherein each of said plurality of master receivers comprises a hard drive utilized to perform digital recording functions;
processing said satellite broadcast signals at at least one of said master receivers with a tuner-and-demodulator card, wherein each of said plurality of master receivers comprises a tuner-and-demodulator card;
communicating said satellite broadcast signals to a first television;
providing a plurality of slave clients in communication with each of said master receivers to receive said satellite broadcast signals from said master receivers, wherein said plurality of slave clients are configured without a hard drive and share resources and the digital recording features from the hard drive on each of the master receivers; and
allowing a plurality of additional televisions respectively associated with said slave clients to have access to said satellite broadcast signals processed at each of said master receivers; and
wherein:
each of said plurality of master receivers is configured to share resources with any other master receiver and the plurality of slave clients;
there are more of the plurality of slave clients than the plurality of master receivers are able to support simultaneously;
upon an unavailability of a resource, used for the satellite broadcast services, in the plurality of master receivers, one or more of the plurality of master receivers is configured to send a message to the plurality of slave clients informing a user of the unavailability; and
in response to the message, the user is presented with one or more options for overcoming the availability, wherein the one or more options include turning off one or more of the plurality of slave clients.

10. The method of claim 9, wherein said on-site network is located in a single family home.

11. The method of claim 9, wherein said on-site network is located in a commercial establishment.

12. The method of claim 9, wherein said satellite broadcast signals are transmitted from said master receivers to said slave clients by home networking technology.

13. The method of claim 9, said method further comprising the step of:
providing each of said slave clients access to network resources and applications through at least one of said master receivers.

14. The method of claim 9, wherein said tuner-and-demodulator card is snap-in installable at each of said master receivers and also removable from each of said master receivers.

15. The method of claim 9, wherein each of said hard drives stores various system resources and applications.

16. An on-site satellite network system comprising:
a plurality of master receivers operable to communicate with an antenna unit for receiving satellite broadcast signals and also displaying them on a plurality of first televisions associated with said master receivers, each of said master receivers having a tuner-and-demodulator card for processing the satellite broadcast signals received from said antenna unit, and each of said master receivers having a hard drive utilized to perform digital recording functions; and a plurality of slave clients operable to communicate with each of said master receivers through home networking technology for receiving said satellite broadcast signals from each of said master receivers, wherein said plurality of slave clients are configured without a hard drive and share resources and the digital recording features from the hard drive on the master receiver; and wherein:

each of said plurality of master receivers is configured to share resources with any other master receiver and the plurality of slave clients;

there are more of the plurality of slave clients than the plurality of master receivers are able to support simultaneously;

upon an unavailability of a resource, used for the satellite broadcast services, in the plurality of master receivers, one or more of the plurality of master receivers is configured to send a message to the plurality of slave clients informing a user of the unavailability; and in response to the message, the user is presented with one or more options for overcoming the availability, wherein the one or more options include turning off one or more of the plurality of slave clients.

17. The system of claim 16, wherein said plurality of slave clients are operable to communicate with each of said master receivers through said home networking technology for also displaying said satellite broadcast signals on a plurality of additional televisions respectively associated with said slave clients.

18. The system of claim 16, wherein said satellite network system is located in a single family home.

19. The system of claim 16, wherein said satellite network system is located in a commercial establishment.

20. The system of claim 16, said system further comprising:

a computer for being shared by each of said master receivers and said slave clients within said satellite network system.

\* \* \* \* \*